(12) United States Patent
Hamada et al.

(10) Patent No.: US 7,077,896 B2
(45) Date of Patent: Jul. 18, 2006

(54) PIGMENT COMPOSITION AND USE THEREOF IN PLASTIC

(75) Inventors: Naoki Hamada, Tokyo (JP); Mikiya Kato, Tokyo (JP); Akiyoshi Iguchi, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 29 days.

(21) Appl. No.: 10/864,323

(22) Filed: Jun. 10, 2004

(65) Prior Publication Data

US 2005/0004276 A1     Jan. 6, 2005

(30) Foreign Application Priority Data

Jun. 13, 2003   (JP)   ............... 2003-168805

(51) Int. Cl.
*C09B 47/04* (2006.01)
*C09B 47/30* (2006.01)
*C07D 487/22* (2006.01)

(52) U.S. Cl. .................. 106/411; 106/410; 106/412; 106/413; 264/330; 264/331.11; 524/88; 540/122; 540/136

(58) Field of Classification Search ............... 106/410, 106/411, 412, 413; 540/122, 136; 524/88; 264/330, 331.11
See application file for complete search history.

(56) References Cited

U.S. PATENT DOCUMENTS

| | | | |
|---|---|---|---|
| 2,861,005 A | | 11/1958 | Sielel |
| 3,767,442 A | * | 10/1973 | Kienzle et al. ............. 106/411 |
| 3,891,455 A | * | 6/1975 | Langley et al. ............. 106/411 |
| 3,981,734 A | | 9/1976 | Cabut |
| 4,088,507 A | * | 5/1978 | Tanaka et al. ............. 106/411 |
| 4,141,904 A | * | 2/1979 | Cabut et al. ................ 540/123 |
| 4,233,206 A | | 11/1980 | Katsura et al. |
| 5,271,759 A | | 12/1993 | Wooden et al. |
| 5,282,896 A | * | 2/1994 | Tsuchida et al. ............ 106/411 |
| 5,358,833 A | * | 10/1994 | Itoh et al. ................ 430/495.1 |
| 5,618,930 A | * | 4/1997 | Kimura et al. .............. 540/143 |
| 6,087,492 A | * | 7/2000 | Wolleb ....................... 540/139 |

FOREIGN PATENT DOCUMENTS

| | | | |
|---|---|---|---|
| FR | 2 278 739 | | 2/1976 |
| FR | 2 292 001 | | 6/1976 |
| GB | 949739 | | 6/1962 |
| JP | 52-124039 | | 10/1977 |
| JP | 53-7185 | | 3/1978 |
| JP | 57-155242 A | * | 9/1982 |
| JP | 58-125752 A | * | 7/1983 |
| JP | 3-12432 | | 1/1991 |
| JP | 5-194873 A | * | 8/1993 |

OTHER PUBLICATIONS

Patent Abstracts of Japan, vol. 0113, No. 61 (C-459), Nov. 25, 1997-Abstract of JP 62 131054, Jun. 13, 1987.

* cited by examiner

*Primary Examiner*—Anthony J. Green
(74) *Attorney, Agent, or Firm*—Wenderoth, Lind & Ponack, L.L.P.

(57) ABSTRACT

A pigment composition composed of 50 to 95% by weight of a phthalocyanine, 1 to 45% by weight of a halogenated phthalocyanine of which the number of substituents of a halogen atom is 1 to 9 and the average number of the substituents is 2.0 to 4.0 and 0.1 to 10% by weight of a phthalocyanine derivative of the formula (1) or a phthalimide methylated phthalocyanine derivative, a colorant containing the above pigment composition and a molded article obtained from a plastic containing the above colorant, $$P\text{---}(X)m \qquad (1)$$

wherein P represents a phthalocyanine structure, X represents an alkyl group having 12 to 18 carbon atoms, an alkoxy group having 12 to 18 carbon atoms, $-SO_2NHR$, $-SO_2NR_2$, $-NR_2$, $-CONR_2$, $-CONHR$ or $-SR$ (wherein R represents an alkyl group or an alkenyl group which has 12 to 18 carbon atoms), and m is an integer of 1 to 4.

5 Claims, No Drawings

PIGMENT COMPOSITION AND USE THEREOF IN PLASTIC

FIELD OF THE INVENTION

The present invention relates to a pigment composition for coloring. Specifically, it relates to a colorant formed of a phthalocyanine pigment as a main coloring ingredient and a plastic molded article which is colored with the above colorant and is small in warpage or deformation.

PRIOR ARTS OF THE INVENTION

Phthalocyanine pigments used as a colorant for a plastic have characteristic features such as light resistance, heat resistance, resistance to transferability, a clear hue and high tinting strength. However, when the phthalocyanine pigment is used for coloring a thermoplastic resin which has crystallinity partially, such as polyolefin or polyethylene terephthalate, the phthalocyanine pigment exerts an influence upon the crystallinity or crystallization direction of the resin during molding. As a result, a plastic molded article warps or deforms. It is thought that this is because the phthalocyanine pigment works as a crystallizing agent for the resin.

For improving the warpage or deformation of a plastic molded article, molding makers are aiming at optimization by changing processing conditions such as a molding temperature, an injection pressure, an injection time, an injection speed or a cooling time. However, a contraction coefficient differs depending upon the kind of a resin, a colorant, an additive and the size or shape of a molded article so that it is difficult to set processing conditions in consideration of warpage or deformation. In many cases, the cycle of molding is lengthened, which worsens productivity.

As another means for improving the warpage or deformation, a strong crystallizing agent (a crystalline nucleus agent, a nucleus-forming agent or a crystallization accelerating agent) is added. The addition of the crystallizing agent has a function of rapidly generating a fine crystal since a component to become a crystalline nucleus is added in a large amount. Seemingly, it has an effect of decreasing the influence of the phthalocyanine pigment upon contraction. Further, it is known that the use of the crystallizing agent can shorten the cycle of molding and bring about an improvement in stiffness or transparency. As a crystallizing agent, for example, there is used a metal carboxylate such as sodium benzoate, 4-tert-butyl aluminum benzoate or sodium adipate, an acid metal phosphate such as sodium bis(4-tert-butylphenyl)phosphate or sodium-2,2'-methylenebis(4,6-di-tert-butylpheynl)phosphate, or a sorbitol acetal type agent such as dibenzylidene sorbitol or bis (methylbenzylidene) sorbitol. However, the crystallizing agent has an insufficient effect on the warpage or deformation.

Further, methods in which a pigment is modified so as not to work as a crystalline nucleus have been studied. Attempts are carried out to change the crystal form, particle diameter or shape of a pigment, to modify the surface of a pigment by adding a pigment derivative (organic coloring matter compound) obtained by introducing a variety of substituents into a pigment skeleton and to modify the surface of a pigment by surface-treating the pigment with a resin or a silane-coupling agent.

JP-A-04-376232, JP-A-57-155242 and JP-A-58-125752 disclose methods which change the crystal form, particle diameter or shape of a pigment. However, none of them obtains a sufficient effect. Further, a change in the crystal form, particle diameter or shape of the pigment exerts an influence upon the inherent properties of the pigment, such as a hue, dispersibility, tinting strength, heat resistance and light resistance.

As a method for improving the warpage or deformation of the phthalocyanine pigment, there is a method disclosed in Journal of the Japan Society of Colour Material (2003), Vol. 76, p. 97, in which a specific number of halogen atom(s) are introduced into a phthalocyanine structure. This method improves the warpage or deformation but extinguishes the inherent properties of the phthalocyanine pigment such as high tinting strength or high clearness and also changes its hue largely.

As a method of modifying a pigment surface by using a so-called pigment derivative obtained by introducing a substituent into a pigment structure for the purpose of improving warpage or deformation, JP-A-53-7185 and JP-A-03-12432 disclose phthalimide methyl derivatives. This invention improves the warpage or deformation to some extent. However, the improvement is not sufficient. Moreover, when the pigment derivative is added in an amount required for improving the warpage, color transferability worsens, so that the above method has not yet applied to practical use.

As a method of modifying a pigment surface with a material other than the pigment derivative, a surface-treatment with an organic silane or an organic titanium and a surface coating of a pigment with a thermoplastic resin are carried out. JP-A-05-194873 discloses that a pigment surface is modified with a polymer formed of a water-soluble high-molecular ammonium salt in the copresence of a sulfonic acid having an organic pigment residue and the polymer. However, the effect is insufficient in each method.

SUMMARY OF THE INVENTION

It is an object of the present invention to provide a pigment composition containing a phthalocyanine which pigment composition, when used for coloring a plastic, can give a molded article free from warpage or deformation without impairing excellent properties of the phthalocyanine as a colorant, and a colorant obtained therefrom.

According to the present invention, there is provided a pigment composition composed of 50 to 95% by weight of a phthalocyanine, 1 to 45% by weight of a halogenated phthalocyanine of which the number of substituents of a halogen atom is 1 to 9 and the average number of the substituents is 2.0 to 4.0, and 0.1 to 10% by weight of a phthalocyanine derivative represented by the formula (1) or the formula (2), $$P\text{—}(X)m \qquad (1)$$

wherein P represents a phthalocyanine structure, X represents an alkyl group having 12 to 18 carbon atoms, an alkoxy group having 12 to 18 carbon atoms, —SO$_2$NHR, —SO$_2$NR$_2$, —NR$_2$, —CONR$_2$, —CONHR or —SR (wherein R represents an alkyl group having 12 to 18 carbon atoms or an alkenyl group having 12 to 18 carbon atoms), and m is an integer of 1 to 4,

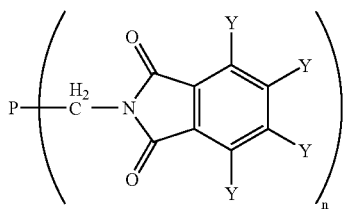

(2)

wherein P represents a phthalocyanine structure, Y is a hydrogen atom or a halogen atom, and n is an integer of 1 to 4.

According to the present invention, further, there is provided a colorant for a plastic formed of the above pigment composition.

According to the present invention, further, there is provided a powdery colorant composed of the above pigment composition and an aliphatic metal carboxylate or an aromatic metal carboxylate.

According to the present invention, further, there is provided a colorant obtained by compounding the above pigment composition at a high concentration with a plastic.

According to the present invention, further, there is provided a colorant according to the above, wherein the plastic is a polyolefin.

According to the present invention, further, there is provided a molded article obtained by compounding the colorant recited above with a plastic.

DETAILED DESCRIPTION OF THE INVENTION

The present invention will be explained in detail hereinafter. The phthalocyanine used in the present invention is a metal-free phthalocyanine or a metal phthalocyanine such as a copper phthalocyanine or an aluminum phthalocyanine. The presence or absence of a central metal and the kind of the phthalocyanine are not specially limited.

The same phthalocyanine as above may be used for the phthalocyanine structure (P) of the formula (1) or the formula (2) in the present invention.

The process for producing the halogenated phthalocyanine used in the present invention is selected from generally known production processes of halogenated phthalocyanines, and it is not specially limited so long as the number of substituents of a halogen atom is from 1 to 9 and the average number of the substituents is from 2.0 to 4.0. Examples of the production process include a production process in which a halogenated phthalic acid having a halogen atom substituent introduced therein is used to synthesize a crude halogenated phthalocyanine, an AlCl$_3$/NaCl Process in which a halogen atom is introduced into a crude phthalocyanine in a molten salt of aluminum chloride or aluminum chloride and a common salt and a production process in which a halogenated phthalonitrile is used to synthesize a crude halogenated phthalocyanine. Of these, a halogenated phthalocyanine obtained by the AlCl$_3$/NaCl Process is excellent in warpage-improvement effect over halogenated phthalocyanines obtained by the other processes, so that the AlCl$_3$/NaCl Process is more preferable. The average number of halogen substituents is adjusted by controlling the amount of a halogen to be introduced. The amount of the halogen to be introduced defers depending upon production process, equipment and reaction conditions. When the halogen amount is small, the average number of halogen substituents is small. When the halogen amount is large, the average number of halogen substituents is large. When the halogen amount is too small, it is undesirable in view of warpage-improvement effect. When the halogen amount is too large, undesirably, the warpage improvement effect or hue is poor. The halogen amount is preferably adjusted such that the average number of halogen substituents becomes from 2.0 to 4.0.

The halogenated phthalocyanine may be used as it is, while it is preferred to convert the crystal form thereof into an amorphous form for further decreasing the behavior thereof as a nucleus agent. For example, the above conversion can be carried out by a known method such as a treatment by an acid pasting method using a sulfuric acid.

The form of the halogenated phthalocyanine is not limited in the present invention. The halogenated phthalocyanine can be used in the form of a powder or an aqueous paste according to a production process of a colorant or a master batch.

The content of the halogenated phthalocyanine in the pigment composition in the present invention is 1 to 45% by weight. The content of the halogenated phthalocyanine is more preferably 5 to 20% by weight in view of a hue. When the content of the halogenated phthalocyanine is small, undesirably, the effect of improving warpage is insufficient. When it is too large, undesirably, the clear hue of phthalocyanine is lost.

The phthalocyanine derivative of the formula (1) or the formula (2) can give a warpage-improving effect even when it is used alone. In this case, it is required that a pigment composition contains 10 to 20% by weight of the phthalocyanine derivative. When the phthalocyanine derivative is used in the above amount required for improving warpage, clearness or a hue worsens. For this reason, it is undesirable in practical use to use the phthalocyanine derivative singly.

The content of the phthalocyanine derivative used in the present invention in the pigment composition is preferably from 0.1 to 10% by weight, more preferably 0.1 to 4% by weight. When the content of the phthalocyanine derivative is too small, undesirably, the effect of improving clearness or warpage is insufficient. When it is larger than 10% by weight, undesirably, the hue is unclear.

When the halogenated phthalocyanine and the phthalocyanine derivative of the formula (1) or the formula (2), which constitute the pigment composition of the present invention, are concurrently used with a phthalocyanine pigment, the thus-obtained pigment composition shows a remarkably large effect of decreasing the warpage or deformation of a molded article when compared with a pigment composition obtained by using the halogenated phthalocyanine or the phthalocyanine derivative singly.

The method of mixing the phthalocyanine with the halogenated phthalocyanine and the phthalocyanine derivative of the formula (1) or the formula (2) is not specially limited. Examples of the mixing method include a method in which powders of these are mixed with a mixing apparatus such as a three-hands mixer, a Henschel mixer, a tumbler or a Nauta mixer, a method in which these components are stirred and mixed in the form of slurries in water or organic solvents, a method in which these components are kneaded with a three-roll mill or a two-roll mill in the presence of a medium, and a method in which the halogenated phthalocyanine and the phthalocyanine derivative of the formula (1) or the formula (2) are added in a pigmentation step such as a kneading step or a solvent treatment step. Preferably, the method in which the above components are mixed in the form of slurries in organic solvents is advantageous in terms of exerting a sufficient effect.

The colorant for a plastic, provided by the present invention, may contain a component other than the pigment composition so long as it hampers the effect of the present invention or causes no sanitary problem. The component other than the pigment composition includes a different organic pigment, an inorganic pigment, a low-molecular-weight polyolefine or a derivative thereof, a heavy metal deactivator, a metallic soap of a metal such as an alkali metal, an alkaline earth metal or zinc, hydrotalcite, an antistatic agent such as a nonionic surface active agent, a cationic surface active agent, an anionic surface active agent or an ampholytic surface active agent, a flame retardant such as a halogen type flame retardant, a phosphorus type flame retardant or a metal oxide, a lubricant such as ethylenebis alkylamide, an antioxidant, an ultraviolet absorber, a processing aid, a filler, and a variety of known additives for a polymer. For satisfying the required quality and coloring workability, phthalocyanine pigment is dispersed with the above component(s) in advance. The colorant of the present invention is provided in the form of a powdery dry color, a granular bead color, a liquid paste color or a liquid color.

A preferable form of the colorant of the present invention is a dry color which is a powdery colorant containing a pigment at a high concentration. The dry color generally contains as a dispersing agent 1 to 1,000 parts by weight of an aliphatic carboxylic acid or an aromatic carboxylic acid and/or a metal salt of any one of these per 100 parts by weight of the total weight of the phthalocyanine, the halogenated phthalocyanine and the phthalocyanine derivative of the formula (1) or the formula (2). Examples of the aliphatic carboxylic acid include caprylic acid, oleic acid, stearic acid, etc. Examples of the aromatic carboxylic acid include phthalic acid, benzoic acid, etc. Examples of the metal include lithium, calcium, magnesium, zinc, etc. The dry color is in the form of powder and thus insufficient in workability. However, the dry color has a high pigment concentration and even a small amount of the dry color can serve for coloring. Therefore, the dry color is the most reasonable economically, so that it is used for coloring a polyolefin in many cases. When the dry color is used for molding, the amount of the dry color per 100 parts by weight of a plastic for the molding is 0.001 to 10 parts by weight. A pellet of plastic and the dry color are uniformly mixed with a mixer, etc., in advance, and then the mixture is subjected to molding processing.

In the present invention, the plastic to be colored is a resin which softens by heating and again hardens by cooling and which has crystallinity partially. Particularly, it includes homopolymers, blocks, or random copolymers or terpolymers of ethylene, propylene, butylene, styrene and/or divinylbenzene, and α-olefins such as HDPE, LDPE, polypropylene and polystyrene. Examples of other useful resins include polyesters such as polyethylene terephthalate, polyamides such as Nylon-6 and Nylon-66, and thermoplastic ionomers. The colorant of the present invention has a high effect on these thermoplastic resins having crystallinity. Particularly, the colorant of the present invention has a remarkable effect on a so-called polyolefin resin such as homopolymers or copolymers of α-olefin ethylene, propylene and butylene.

The polyolefin resin preferably has an MFR (melt flow rate) of 0.001 to 30. When the MFR is smaller than 0.001, undesirably, due to a too high melt viscosity of a coloring resin composition, molding processability worsens in some cases or an molded article has a weld mark or a flow mark in some cases. On the other hand, when the MFR exceeds 30, there is apprehension that the mechanical and physical properties of a molded article descend. Particularly, when a high-density polyethylene is used, the MFR is preferably 0.005 to 10. When a low-density polyethylene, polypropylene or polybutene is used, the MFR is preferably 0.005 to 20.

The colorant of the present invention may be a pellet-form colorant called a masterbatch which is composed of a pigment composition and a plastic and contains a pigment at a high concentration. The masterbatch containing a pigment at a high concentration is diluted with a plastic, and then the masterbatch diluted with the plastic is molded to obtain a molded article.

When the masterbatch is compared with a colored pellet, their processing steps are not largely different from each other. Since the masterbatch contains a pigment at a high concentration, the master batch is slightly more costly than the colored pellet. However, the masterbatch is diluted with a low-price plastic by 0.5 to 200 times for obtaining a molded article. In view of end products, it is cheaper and more preferable to obtain a molded article from the masterbatch by diluting it with a plastic than to obtain a molded article from the coloring pellet.

The masterbatch preferably contains 100 parts by weight of a plastic and 0.1 to 300 parts by weight of the pigment composition of the present invention. When the amount of the pigment composition is smaller than 0.1 part by weight, there is no meaning as a masterbatch. When the amount of the pigment composition is larger than 300 parts by weight, the pelletization of the masterbatch is difficult. The masterbatch containing a pigment at a high concentration is diluted with a plastic and then molded to obtain a molded article. The plastic used for the dilution is, for example, the same as the plastic used for masterbatch containing a pigment at a high concentration. Further, it is preferable that a molded article as an end product from the masterbatch preferably has a plastic content of 100 parts by weight and a colorant content of 0.001 to 10 parts by weight similarly to a molded article obtained from the before-mentioned colored pellet which does not need to be diluted and is directly molded.

The masterbatch may contain some other component so long as it hampers the effect of the present invention or causes no sanitary problem. The other component includes a different organic pigment, an inorganic pigment, a different plastic, a low-molecular-weight polyolefine or a derivative thereof, a heavy metal deactivator, a metallic soap of a metal such as an alkali metal, an alkaline earth metal or zinc, hydrotalcite, an antistatic agent such as a nonionic surface active agent, a cationic surface active agent, an anionic surface active agent or an ampholytic surface active agent, a flame retardant such as a halogen type flame retardant, a phosphorus type flame retardant or a metal oxide, a lubricant such as ethylenebis alkylamide, an antioxidant, an ultraviolet absorber, a processing aid, a filler, and a variety of known additives for a polymer.

In the production of the colorant of the present invention, it is preferred to preprocess the pigment composition of the present invention by treating it with a dispersing agent such as a polyethylene wax before mixing the pigment composition with plastic. As a method for the preprocessing, there are a method in which the pigment composition and the dispersing agent are simply mixed with a mixer and a method in which the pigment composition and the dispersing agent are melt-kneaded and then milled. For obtaining a masterbatch in which the pigment composition is uniformly dispersed, the latter processing method comprising melt-kneading is preferable.

In the present invention, the molding method of molding and processing a plastic for obtaining a molded article is not specially limited. The molding method includes injection molding, blow molding, inflation molding, extrusion molding, Engel molding, vacuum molding, etc. The effect of preventing the warpage or deformation of a colored molded article can be obtained regardless of molding methods.

EXAMPLES

The present invention will be explained more in detail with reference to Examples hereinafter, while the present invention shall not be specially limited to these Examples. In the Examples, "part" and "%" stand for "part by weight" and "%" by weight" respectively, unless otherwise specified. Further, the number of halogen substituents of halogenated phthalocyanine obtained in each of Production Examples was measured by a mass spectrum (JMS-DX303HF supplied by JEOL DATUM LTD.).

Evaluation for warpage or deformation was carried out as follows. A plate was molded with an injection-molding machine using a mold for contractility evaluation (mold provided with marked lines of 10.00 cm in the direction of injection and in the direction perpendicular thereto, for producing a plate having a length of 150 mm, a width of 120 mm and a thickness of 2mm). The molded plate was stored in a thermostatic chamber for 3 days. Then, the degree of warpage or deformation was evaluated by a contraction difference ratio calculated from a ratio between a contraction coefficient in the direction of injection and a contraction coefficient in the direction perpendicular thereto and by visual observation. 20 plates were continuously injection-molded at a molding temperature of 220° C. and at a mold temperature of 40° C., and 6 plates of the 20 plates, from the 14th plate to the 19th plate, were used for the evaluation. The molded plates were stored in a thermostatic chamber for 24 hours or more, then, distances from the marked lines were measured with an accurate caliper, and the contraction coefficient in the direction of injection and the contraction coefficient in the direction perpendicular thereto were obtained from the measured values. Then, the degree of warpage or deformation was evaluated by a contraction difference ratio calculated from a ratio between the contraction coefficient in the direction of injection and the contraction coefficient in the direction perpendicular thereto and by visual observation. The calculating equation for the contraction difference ratio is represented by the equation (1). Generally, when the difference between the contraction difference ratio of a molded plate composed of a pigment and a resin and the contraction difference ratio of a molded plate composed of the resin alone (to be referred to as "natural" hereinafter) is 10% or less, it is called a low contraction pigment or a low contraction pigment composition.

Contraction difference ratio=(contraction coefficient in injection direction−contraction coefficient in perpendicular direction)/contraction coefficient in injection direction    Equation (1):

A standard for the visual observation was as follows. The molded plate was compared with a colorless molded plate (to be referred to as "natural plate" hereinafter) made of a plastic alone, when the degree of warpage or deformation of the molded plate was almost the same as that of the natural plate, it was considered to be free from an influence of a pigment and evaluated as "Good". When the degree of warpage or deformation of the molded plate was intense, it was evaluated as "Poor".

The measurement of a hue was carried out as follows. 1 part of one of pigment compositions used in Examples, 1 part of zinc stearate, 1,000 parts of polypropylene and 50 parts of titanium oxide were sufficiently mixed, the mixture was kneaded with a single-screw extruder to obtain a compound, and the compound was molded with an injection-molding machine, to obtain a molded plate having a thickness of 2 mm. The molded plate was measured for a reflectance with a color-difference meter "KURABO Color-7E" (supplied by KURABO Industries LTD.) to carry out a color measurement in the L*a*b: hue system. Comparative Example 1 using Lionol Blue FG-7351 (C.I. Pigment Blue 15:3, supplied by Toyo Ink Mfg. Co., Ltd.) as a pigment composition was used as a control for the hue difference measurement. A color difference from the control was obtained. When ΔE was in the range of 3.0 or lower and Δb was in the range of 2.0 or lower, the hue was evaluated as "Good". When ΔE and Δb were not in the above ranges, the hue was evaluated as "Poor".

A color development intensity was measured as follows. 1 part of a pigment composition, 1 part of zinc stearate, 1,000 parts of polypropylene and 50 parts of titanium oxide were sufficiently mixed, the mixture was kneaded with a single-screw extruder to obtain a compound, and the compound was molded with an injection-molding machine, to obtain a molded plate having a thickness of 2 mm. The molded plate was measured for a reflectance with a color-difference meter "KURABOColor-7E" (supplied by KURABO Industries LTD.), to measure a reflection intensity at 640 nm. The Kubelka-Munk function (k/s) (color development intensity) of the molded plate was obtained from the above reflection intensity. The number of the color development intensity was rounded off in the first decimal place.

Examples of synthesis of a halogenated phthalocyanine are shown in Production Examples 1 to 4.

Production Example 1

200 parts of aluminum chloride and 40 parts of a common salt were heated to obtain molten salts. 40 parts of a crude copper phthalocyanine was added to the molten salts, the mixture was heated up to 180° C., and chlorine in an amount of 2 parts per hour was introduced for 3 hours. The total amount of the chlorine introduced was 8 parts. After the introduction of the chlorine, the reaction mixture was poured into a large amount of water, followed by filtration and washing with water, drying, and milling, to obtain 46 parts of a chlorinated copper phthalocyanine. The chlorinated copper phthalocyanine was added to 300 parts of 98% sulfuric acid, and the mixture was stirred at 40–45° C. for 4 hours. Then, the mixture was added to 2,000 parts of water. The resultant mixture was stirred at 80° C. for 2 hours, followed by filtration, washing with water, drying, and milling, to obtain 45 parts of a chlorinated copper phthalocyanine. The number of halogen substituents of the chlorinated copper phthalocyanine was 1 to 6, and the average number of the substituents was 3.2.

Production Example 2

200 parts of aluminum chloride and 40 parts of a common salt were heated to obtain molten salts. 40 parts of a crude copper phthalocyanine was added to the molten salts, the mixture was heated up to 180° C., and bromine in an amount of 3 parts per hour was dropwise added for 5 hours. The total amount of the bromine added was 18 parts. After the addition of the bromine, the reaction mixture was poured into a large amount of water, followed by filtration and washing with water, drying, and milling, to obtain 55 parts of a brominated copper phthalocyanine. The brominated copper phthalocyanine was added to 300 parts of 98% sulfuric acid, and the mixture was stirred at 40–45° C. for 4 hours. Then, the mixture was added to 2,000 parts of water. The resultant mixture was stirred at 80° C. for 2 hours, followed by filtration, washing with water, drying, and milling, to obtain 52 parts of a brominated copper phthalocyanine. The number of halogen substituents of the brominated copper phthalocyanine was 1 to 5, and the average number of the substituents was 2.8.

Production Example 3

200 parts of aluminum chloride and 40 parts of a common salt were heated to obtain molten salts. 40 parts of a crude copper phthalocyanine was added to the molten salts, the mixture was heated up to 180° C., and chlorine in an amount of 2 parts per hour was introduced for 10 hours. The total amount of the chlorine introduced was 22 parts. After the introduction of the chlorine, the reaction mixture was poured into a large amount of water, followed by filtration and washing with water, drying, and milling, to obtain 58 parts of a chlorinated copper phthalocyanine. The chlorinated copper phthalocyanine was added to 300 parts of 98% sulfuric acid, and the mixture was stirred at 40–45° C. for 4 hours. Then, the mixture was added to 2,000 parts of water. The resultant mixture was stirred at 80° C. for 2 hours, followed by filtration, washing with water, drying, and milling, to obtain 57 parts of a chlorinated copper phthalocyanine. The number of halogen substituents of the chlorinated copper phthalocyanine was 5 to 11, and the average number of the substituents was 8.0.

hour was introduced for 9 hours. The total amount of the chlorine introduced was 20 parts. After the introduction of the chlorine, the reaction mixture was poured into a large amount of water, followed by filtration and washing with water, drying, and milling, to obtain 92 parts of a brominated and chlorinated copper phthalocyanine. The brominated and chlorinated copper phthalocyanine was added to 600 parts of 98% sulfuric acid, and the mixture was stirred at 40–45° C. for 4 hours. Then, the mixture was added to 4,000 parts of water. The resultant mixture was stirred at 80° C. for 2 hours, followed by filtration, washing with water, drying, and milling, to obtain 90 parts of a brominated and chlorinated copper phthalocyanine. The number of halogen substituents of the brominated and chlorinated copper phthalocyanine was 12 to 16, and the average number of the substituents was 14.5.

Example 1

88 parts of a phthalocyanine pigment (C.I. Pigment Blue 15:3, trade name Lionol Blue FG-7351, supplied by Toyo Ink Mfg. Co., Ltd.), 10 parts of a halogenated phthalocyanine produced according to the Production Example 1, and 2 parts of a phthalocyanine derivative represented by Compound A were mixed with a mixer, to obtain a pigment composition. Then, 100 parts of the pigment composition and 100 parts of calcium stearate were mixed with a mixer to obtain a colorant. 2 parts of the colorant, 1,000 parts of a high-density polyethylene resin (trade name Hizex 2100J supplied by Sumitomo Mitsui Polyolefin) and a few drops of an adhesion agent were sufficiently mixed by tumbling. Then, the mixture was molded into a plate with an injection molding machine, and the plate was evaluated for warpage or deformation and a hue. In comparison with a natural plate, the above molded plate showed a contraction difference ratio close to that of the natural plate, and the degree of warpage or deformation by visual observation was almost the same as that of the natural plate. Further, the hue was good similarly to a plate colored with the phthalocyanine pigment alone. The above molded plate was a high tinting strength plate.

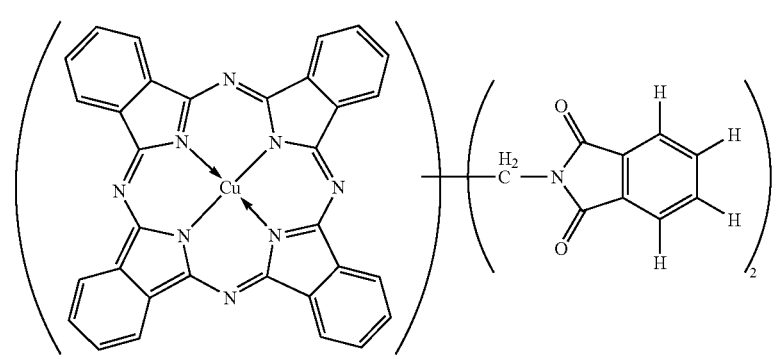

Compound A

Production Example 4

200 parts of aluminum chloride and 40 parts of a common salt were heated to obtain molten salts. 40 parts of a crude copper phthalocyanine was added to the molten salts, the mixture was heated up to 180° C., and bromine in an amount of 6 parts per hour was dropwise added for 6 hours. The total amount of the bromine added was 42 parts. After the addition of the bromine, chlorine in an amount of 2 parts per Comparative Example 1

A molded plate was prepared in the same manner as in Example 1 except that the halogenated phthalocyanine and the phthalocyanine derivative used in Example 1 were not used. In comparison with a natural plate, the contraction difference ratio of the molded plate was large, and the degree of warpage or deformation was also large by visual observation.

Comparative Example 2

A molded plate was prepared in the same manner as in Example 1 except that the phthalocyanine derivative used in Example 1 was not used. In comparison with a natural plate or the plate of Example 1, the contraction difference ratio was large, and the degree of warpage or deformation was also large by visual observation.

Comparative Example 3

A molded plate was prepared in the same manner as in Example 1 except that the halogenated phthalocyanine used in Example 1 was not used. In comparison with a natural plate or the plate of Example 1, the contraction difference ratio was large, and the degree of warpage or deformation was also large by visual observation.

Comparative Example 4

A molded plate was prepared in the same manner as in Example 1 except that the halogenated phthalocyanine used in Example 1 was not used and that the amount of the phthalocyanine derivative was changed to 20 parts. The contraction difference ratio thereof was small and no warpage was found by visual observation. However, the hue thereof was poor, and the color development was poor or 95% based on the control.

Comparative Example 5

A molded plate was prepared in the same manner as in Example 1 except that the pigment composition used in Example 1 was replaced with 100 parts of a halogenated phthalocyanine produced according to the Production Example 1. In comparison with a natural plate, the above molded plate showed a contraction difference ratio close to that of the natural plate, and the degree of warpage or deformation by visual observation was almost the same as that of the natural plate. However, the hue was poor, and the color development was poor or 90% based on the control.

Example 2

A molded plate was prepared in the same manner as in Example 1 except that the high-density polyethylene resin (trade name Hizex 2100J supplied by Sumitomo Mitsui Polyolefin) used in Example 1 was replaced with a polypropylene resin (trade name Mitsui Sumitomo PP, supplied by Sumitomo Mitsui Polyolefin) In comparison with a natural plate, the above molded plate showed a contraction difference ratio close to that of the natural plate, and the degree of warpage or deformation by visual observation was almost the same as that of the natural plate. Further, the hue was good and the tinting strength was equivalent to that of the control.

Comparative Example 6

A molded plate was prepared in the same manner as in Example 2 except that the halogenated phthalocyanine and the phthalocyanine derivative used in Example 2 were not used. In comparison with a natural plate, the contraction difference ratio was large, and the degree of warpage or deformation was also large by visual observation.

Comparative Example 7

A molded plate was prepared in the same manner as in Example 2 except that the phthalocyanine pigment used in Example 2 was not used. In comparison with a natural plate or the plate of Example 1, the contraction difference ratio was large, and the degree of warpage or deformation was also large by visual observation.

Comparative Example 8

A molded plate was prepared in the same manner as in Example 2 except that the halogenated phthalocyanine used in Example 2 was not used. In comparison with a natural plate or the plate of Example 1, the contraction difference ratio was large, and the degree of warpage or deformation was also large by visual observation.

Example 3

A molded plate was prepared in the same manner as in Example 1 except that the halogenated phthalocyanine used in Example 1 was replaced with a halogenated phthalocyanine produced according to the Production Example 2. In comparison with a natural plate, the above molded plate showed a contraction difference ratio close to that of the natural plate, and the degree of warpage or deformation by visual-observation was almost the same as that of the natural plate. Further, the hue was good and the tinting strength was equivalent to that of the control.

Comparative Examples 9–10

Molded plates were obtained in the same manner as in Example 3 except that the halogenated phthalocyanine used in Example 3 was replaced with a halogenated phthalocyanine produced according to the Production Example 3 in Comparative Example 9, and that the halogenated phthalocyanine was replaced with a halogenated phthalocyanine produced according to the Production Example 4 in Comparative Example 10. Each of the molded plates had a large contraction difference ratio and the degree of warpage or deformation of each molded plate was also large by visual observation. Further, the hue of each molded plate was poor.

Examples 4–11

Molded plates were prepared in the same manner as in Example 1 except that the phthalocyanine derivative used in Example 1 was replaced with phthalocyanine derivatives of the following chemical formulae respectively. In comparison with a natural plate, each of the obtained molded plates showed a contraction difference ratio close to that of the natural plate, and the degree of warpage or deformation of each molded plate by visual observation was almost the same as that of the natural plate. Further, the hue was good and the tinting strength was equivalent to that of the control.

Example 4:
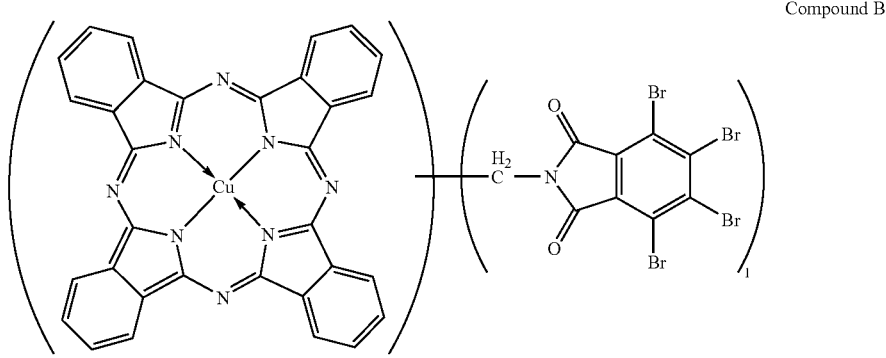
Compound B
Example 5:
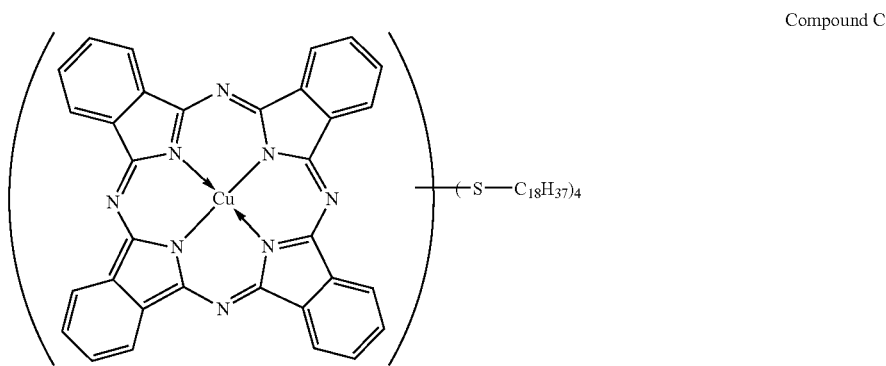
Compound C
Example 6:
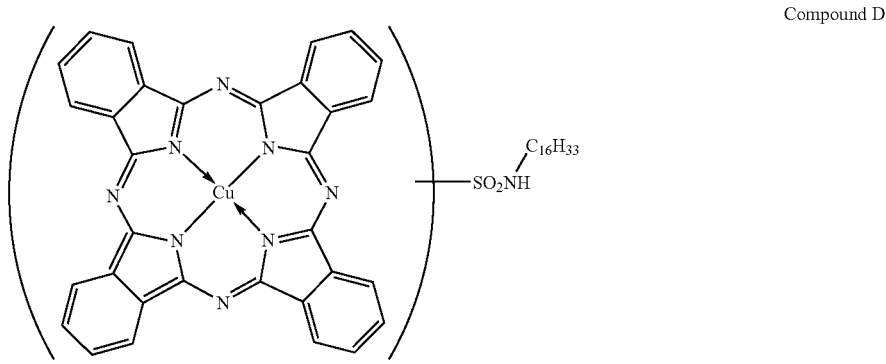
Compound D
Example 7:
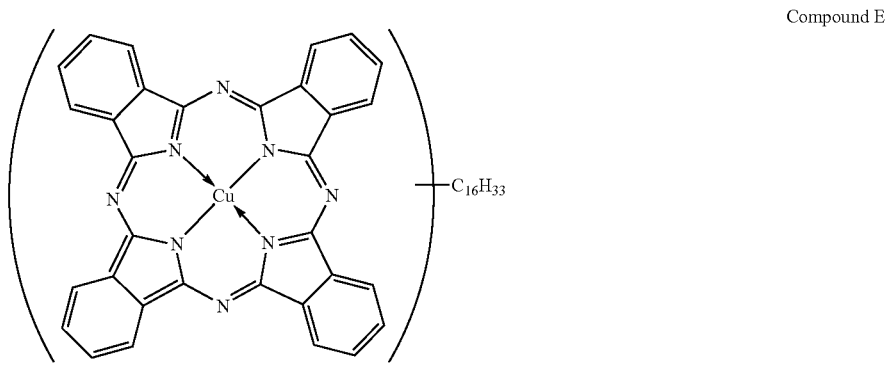
Compound E -continued
Example 8:
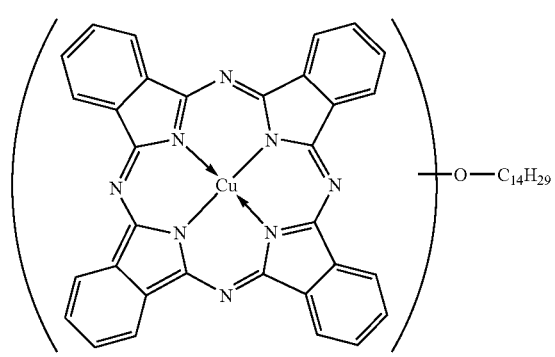
Compound F
Example 9:
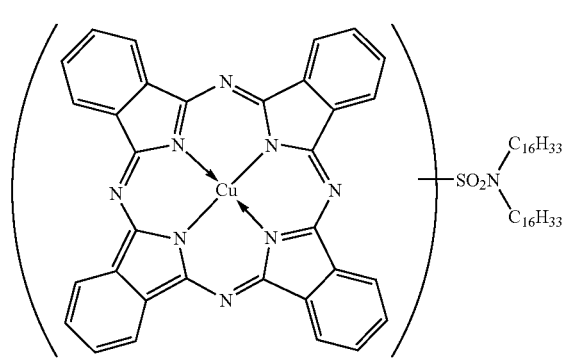
Compound G
Example 10:
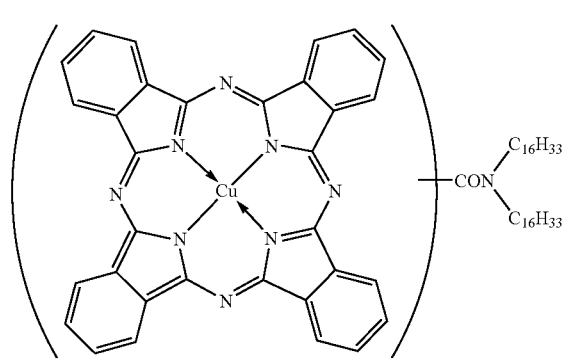
Compound H
Example 11:
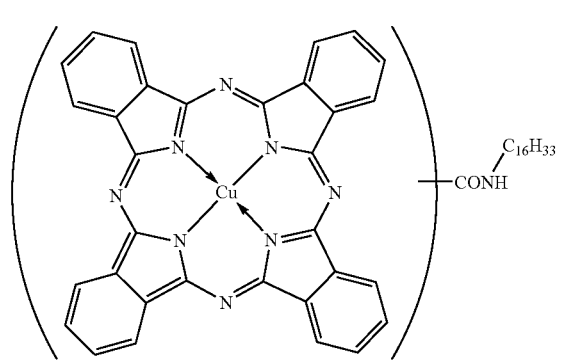
Compound I

Example 12

88 parts of a phthalocyanine pigment (C.I. Pigment Blue 15:3, trade name Lionol Blue FG-7351, supplied by Toyo Ink Mfg. Co., Ltd.), 10 parts of a halogenated phthalocyanine produced according to the Production Example 1, and 2 parts of a phthalocyanine derivative represented by Compound A were mixed with a mixer, to obtain a pigment composition. 100 parts of the pigment composition and a polyethylene wax (trade name: High Wax NL-500, supplied by Mitsui Chemicals, Inc.) were sufficiently mixed, then the mixture was melt-kneaded with a three-roll, and then the kneaded mixture was milled to obtain a processing pigment. 4 parts of the processing pigment and 100 parts of a high-density polyethylene were mixed and then the mixture was melt-kneaded with a twin-screw extruder, to obtain a pellet-form masterbatch. Then, 5 parts of the masterbatch and 100 parts of a high-density polyethylene resin (trade name Hizex 2100J supplied by Sumitomo Mitsui Polyolefin) were mixed and then the mixture was injection-molded with an injection molding machine into a plate similarly to Example 1. The molded plate was similarly evaluated. In comparison with a natural plate or the plate of Example 1, the above molded plate showed a contraction difference ratio close to that of the natural plate or the plate of Example 1, and the degree of warpage or deformation by visual observation was almost the same as that of the natural plate or the plate of Example 1.

Example 13

A molded plate was obtained in the same manner as in Example 1 except that the pigment used in Example 1 was replaced with a phthalocyanine pigment (C.I. Pigment Blue 15:1, trade name Lionol Blue 7110-V, supplied by Toyo Ink Mfg. Co., Ltd.). In comparison with a natural plate, the above molded plate showed a contraction difference ratio close to that of the natural plate, and the degree of warpage or deformation by visual observation was almost the same as that of the natural plate. Further, the hue was good similarly to a plate colored with the phthalocyanine pigment alone. The above plate was a high tinting strength plate.

Example 14

88 parts of a phthalocyanine pigment (C.I. Pigment Blue 15:3, trade name Lionol Blue FG-7351, supplied by Toyo Ink Mfg. Co., Ltd.), 10 parts of a halogenated phthalocyanine produced according to the Production Example 1, and 2 parts of a phthalocyanine derivative represented by Compound A were mixed with a mixer, to obtain a pigment composition. 1 part of the above pigment composition, 1 part of magnesium stearate and 1,000 parts of a polyethylene terephthalate resin (trade name Vylopet EMC-307, Toyobo Co., Ltd.) were mixed, the mixture was kneaded with an injection-molding machine at a molding temperature of 275° C. and at a mold temperature of 85° C., to obtain a molded plate. In comparison with a natural plate, the above molded plate showed a contraction difference ratio close to that of the natural plate, and the degree of warpage or deformation by visual observation was almost the same as that of the natural plate. Further, the hue was good similarly to a plate colored with the phthalocyanine pigment alone. The above molded plate was a high tinting strength plate.

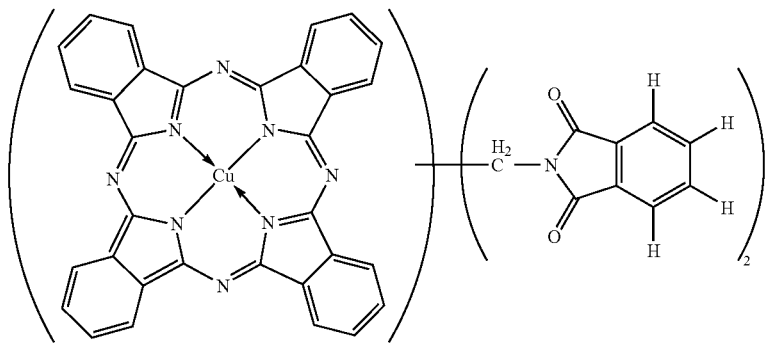

Compound A

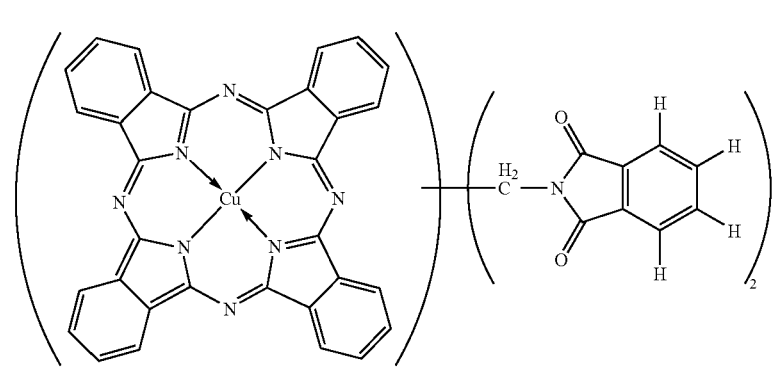

Compound A

Comparative Example 11

A molded plate was obtained in the same manner as in Example 9 except that the halogenated phthalocyanine and the phthalocyanine derivative used in Example 9 were not used. In comparison with a natural plate, the contraction difference ratio of the molded plate was large, and the degree of warpage or deformation was also large by visual observation.

Table 1 shows results of Examples 1–14 and Comparative Example 1–11.

TABLE 1

| | Kind of Pigment | Halogenated phthalocyanine | | Phthalocyanine derivative | | |
|---|---|---|---|---|---|---|
| | C.I. Pigment Index | Production Example | Content (% by weight) | Compound | Content (% by weight) | Resin |
| Ex. 1 | Pigment Blue 15:3 | Production Example 1 | 10 | Compound A | 2 | HDPE |
| CEx. 1 | Pigment Blue 15:3 | | | | | HDPE |
| CEx. 2 | Pigment Blue 15:3 | Production Example 1 | 10 | | | HDPE |
| CEx. 3 | Pigment Blue 15:3 | | | Compound A | 2 | HDPE |
| CEx. 4 | Pigment Blue 15:3 | | | Compound A | 20 | HDPE |
| CEx. 5 | | Production Example 1 | 100 | | | HDPE |
| Ex. 2 | Pigment Blue 15:3 | Production Example 1 | 10 | Compound A | 2 | PP |
| CEx. 6 | Pigment Blue 15:3 | | | | | PP |
| CEx. 7 | Pigment Blue 15:3 | Production Example 1 | 10 | | | PP |
| CEx. 8 | Pigment Blue 15:3 | | | | | PP |
| Ex. 3 | Pigment Blue 15:3 | Production Example 2 | 10 | Compound A | 2 | HDPE |
| CEx. 9 | Pigment Blue 15:3 | Production Example 3 | 10 | | | HDPE |
| CEx. 10 | Pigment Blue 15:3 | Production Example 4 | 10 | | | HDPE |
| Ex. 4 | Pigment Blue 15:3 | Production Example 1 | 10 | Compound B | 2 | HDPE |
| Ex. 5 | Pigment Blue 15:3 | Production Example 1 | 10 | Compound C | 2 | HDPE |
| Ex. 6 | Pigment Blue 15:3 | Production Example 1 | 10 | Compound D | 2 | HDPE |
| Ex. 7 | Pigment Blue 15:3 | Production Example 1 | 10 | Compound E | 2 | HDPE |
| Ex. 8 | Pigment Blue 15:3 | Production Example 1 | 10 | Compound F | 2 | HDPE |
| Ex. 9 | Pigment Blue 15:3 | Production Example 1 | 10 | Compound G | 2 | HDPE |
| Ex. 10 | Pigment Blue 15:3 | Production Example 1 | 10 | Compound H | 2 | HDPE |
| Ex. 11 | Pigment Blue 15:3 | Production Example 1 | 10 | Compound I | 2 | HDPE |
| Ex. 12 | Pigment Blue 15:3 | Production Example 1 | 10 | Compound A | 2 | HDPE |
| Ex. 13 | Pigment Blue 15:1 | Production Example 1 | 10 | Compound A | 2 | HDPE |
| Ex. 14 | Pigment Blue 15:3 | Production Example 1 | 10 | Compound A | 2 | PET |
| CEx. 11 | Pigment Blue 15:3 | | | | | PET |

TABLE 1-continued

|  | Measurement results of Plate | | | |
|---|---|---|---|---|
|  | Contraction difference ratio | Warpage (Visual observation) | Hue | Color development |
| Ex. 1 | 3.4 | Good | Good | 100 |
| CEx. 1 | 45.7 | Poor | Good | 100 |
| CEx. 2 | 22.0 | Poor | Good | 100 |
| CEx. 3 | 31.0 | Poor | Good | 100 |
| CEx. 4 | 9.2 | Good | Poor | 95 |
| CEx. 5 | 7.7 | Good | Poor | 90 |
| Ex. 2 | −8.8 | Good | Good | 100 |
| CEx. 6 | −23.0 | Poor | Good | 100 |
| CEx. 7 | −19.0 | Poor | Good | 100 |
| CEx. 8 | −15.0 | Poor | Good | 100 |
| Ex. 3 | 3.6 | Good | Good | 100 |
| CEx. 9 | 45.1 | Poor | Poor | 92 |
| CEx.10 | 43.7 | Poor | Poor | 94 |
| Ex. 4 | 3.7 | Good | Good | 100 |
| Ex. 5 | 5.2 | Good | Good | 100 |
| Ex. 6 | 8.9 | Good | Good | 100 |
| Ex. 7 | 7.7 | Good | Good | 100 |
| Ex. 8 | 5.3 | Good | Good | 100 |
| Ex. 9 | 5.9 | Good | Good | 100 |
| Ex.10 | 8.6 | Good | Good | 100 |
| Ex.11 | 6.2 | Good | Good | 100 |
| Ex.12 | 6.8 | Good | Good | 100 |
| Ex.13 | 9.1 | Good | Good | 100 |
| Ex.14 | 9.8 | Good | Good | 100 |
| CEx.11 | 22.4 | Poor | Good | 100 |

Ex. = Example,
CEx. = Comparative Example

Effect of the Invention

According to the present invention, the warpage, deformation or dimensional change of a molded article can be decreased while retaining excellent properties of clear hue and color development of phthalocyanine. The number of defective 10 articles due to warpage or deformation of a molded article decreases, so that an improvement in productivity is achieved.

What is claimed is:

1. A pigment composition composed of 50 to 95% by weight of a phthalocyanine, 1 to 45% by weight of a halogenated phthalocyanine of which the number of substituents of a halogen atom is 1 to 9 and the average number of the substituents is 2.0 to 4.0, and 0.1 to 10% by weight of a phthalocyanine derivative represented by the formula (1):

wherein P represents a phthalocyanine structure, X represents an alkyl group having 12 to 18 carbon atoms, an alkoxy group having 12 to 18 carbon atoms, —SO$_2$NHR, —SO$_2$NR$_2$, —NR$_2$, —CONR$_2$, —CONHR or —SR (wherein R represents an alkyl group having 12 to 18 carbon atoms or an alkenyl group having 12 to 18 carbon atoms), and m is an integer of 1 to 4;

or formula (2)

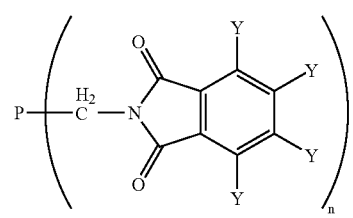

wherein P represents a phthalocyanine structure, Y is a hydrogen atom or a halogen atom, and n is an integer of 1 to 4.

2. A powdery colorant composed of the pigment composition recited in claim 1 and an aliphatic metal carboxylate or an aromatic metal carboxylate.

3. A colorant composed of 100 parts by weight of a plastic and 0.1 to 300 parts by weight of the pigment composition recited in claim 1.

4. The colorant according to claim 3, wherein the plastic is a polyolefin.

5. A molded article obtained by molding a composition containing 100 parts by weight of a plastic and 0.001 to 10 parts by weight of the colorant recited in claim 3.

* * * * *